United States Patent [19]

Bieker

[11] Patent Number: 5,799,583
[45] Date of Patent: Sep. 1, 1998

[54] RAIL VEHICLE WITH OSCILLATION DAMPING SIDE WALL CONSTRUCTION

[75] Inventor: Guido Bieker, Kirchhunden, Germany

[73] Assignee: ABB Henschel Aktiengesellschaft, Mannheim, Germany

[21] Appl. No.: 760,822

[22] Filed: Dec. 5, 1996

Related U.S. Application Data

[63] Continuation of PCT/EP96/01314 Mar. 26, 1996.

[30] Foreign Application Priority Data

Apr. 5, 1995 [DE] Germany ............... 195 12 629.7

[51] Int. Cl.⁶ ............................................... B61D 17/04
[52] U.S. Cl. ........................... 105/401; 105/452; 296/191
[58] Field of Search ............................... 105/396, 397, 105/401, 404, 409, 452; 296/187, 191, 197

[56] References Cited

U.S. PATENT DOCUMENTS

| | | | |
|---|---|---|---|
| 4,226,189 | 10/1980 | Bertolini | 105/423 |
| 4,964,347 | 10/1990 | Long et al. | 105/404 |
| 4,974,900 | 12/1990 | Destefani et al. | 105/401 |
| 5,267,515 | 12/1993 | Tsuruda et al. | 105/401 |
| 5,339,745 | 8/1994 | Ritzl et al. | 105/452 |
| 5,433,151 | 7/1995 | Ohara et al. | 105/401 |

*Primary Examiner*—S. Joseph Morano
*Attorney, Agent, or Firm*—Herbert L. Lerner; Laurence A. Greenberg

[57] ABSTRACT

A rail vehicle includes a self-supporting car body having a floor and a roof as well as side walls with windows and an entrance region. The side walls are each formed by a framework connected to the floor in a flexurally rigid manner and the side walls have side-wall elements. The side-wall elements are of rigid construction and are fastened in a non-load-bearing manner to the framework through the use of an adhesive connection. The adhesive connection serves to dampen oscillations occurring during operation of the rail vehicle.

12 Claims, 1 Drawing Sheet

U.S. Patent    Sep. 1, 1998    5,799,583
Fig.1
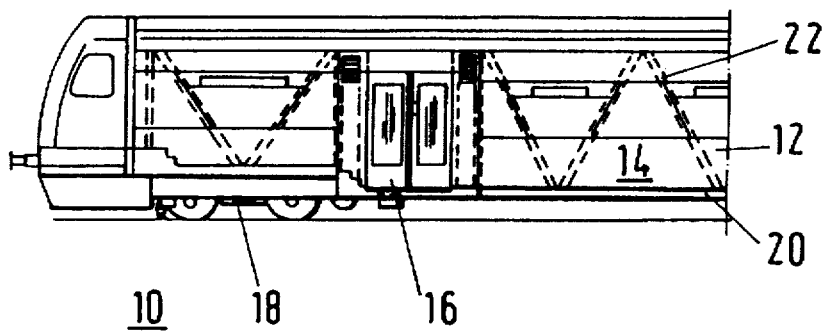
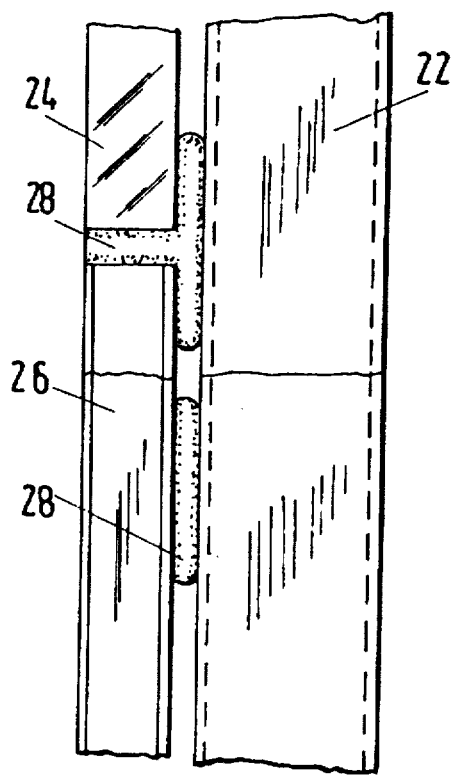
Fig.2
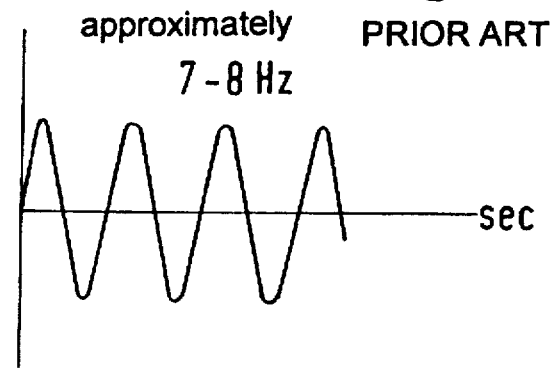
Fig.3 PRIOR ART
approximately 7-8 Hz
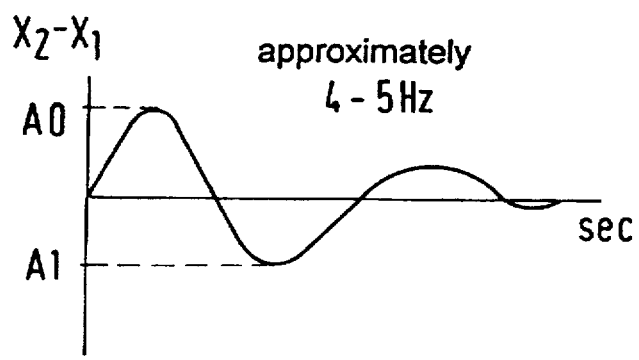
Fig.4
$X_2 - X_1$
approximately 4-5 Hz

RAIL VEHICLE WITH OSCILLATION DAMPING SIDE WALL CONSTRUCTION

CROSS-REFERENCE TO RELATED APPLICATION

This application is a Continuation of International Application Ser. No. PCT/EP96/01314, filed Mar. 26, 1996.

BACKGROUND OF THE INVENTION

FIELD OF THE INVENTION

The invention relates to a rail vehicle including a car body having a floor and a roof as well as side walls which have windows and entrance regions.

Known rail vehicles have a supporting frame which on one hand is connected to wheel sets directly or through a truck or bogie frame and on the other hand accommodates the car body. In particular in the case of enclosed rail vehicles, such as for passenger transport for example, it is known to incorporate the car construction in the structure with respect to mechanical stresses, with the side walls allocated to the car body and the roof being integral components of the load-bearing structure. For this purpose, the side walls are produced, for example, from steel sheet, with reinforcing struts being added if need be at critical locations.

Rail vehicles which are constructed in that way are relatively rigid in terms of flexure and torsion, which leads to the displacement to higher frequencies of natural bending frequencies that occur during operation and impair the traveling comfort. That results in those oscillations feeling less disturbing due to the lower oscillation energy at high frequencies. An undesirable accompanying effect of that "rigid" construction of the vehicle tube on one hand is the often considerable dead weight which requires corresponding drive output, and on the other hand is the fact that, in order not to put the requisite rigidity at risk, it is not possible to realize any optimization desired from the point of view of operating requirements, for example with regard to the configuration of the entrance regions, without impairing the traveling comfort.

SUMMARY OF THE INVENTION

It is accordingly an object of the invention to provide a rail vehicle, which overcomes the hereinafore-mentioned disadvantages of the heretofore-known devices of this general type, which has a lightweight construction and which in addition equally meets requirements for traveling comfort and variability of the configuration of entrance regions.

With the foregoing and other objects in view there is provided, in accordance with the invention, a rail vehicle, comprising a self-supporting car body having a floor, a roof and side walls; the side walls having windows, having entrance regions, each having a framework flexurally rigidly connected to the floor, and having rigid side-wall elements; and an adhesive connection non-load-bearingly fastening the side-wall elements to the framework, the adhesive connection dampening oscillations occurring during operation of the rail vehicle.

In accordance with another feature of the invention, the adhesive connection dampens the oscillations occurring during operation of the rail vehicle by performing damping work by relative movement of the adhesive partners at the respective adhesive location.

In accordance with a further feature of the invention, the side-wall is constructed in such a way that the adhesive connection is a thick-layer adhesive bond having a thickness of the adhesive layer of at least 3 mm.

In accordance with an added feature of the invention, the thick adhesive layer has a layer thickness of 3 to 12 mm, in which case a thick-layer adhesive bond proving to be especially advantageous has an adhesive-layer thickness of 5 to 8 mm and preferably 6 mm.

The lower limit imposed on the adhesive-layer thickness results both from the knowledge that relative movements between the framework on one hand and the side-wall element that is configured, for example, in a sandwich type of construction on the other hand, must be absorbed and must not lead to peeling of the adhesive or to damage to the thick adhesive layer, as well as from the suitability, intended according to the invention, for absorbing the damping work, which is carried out all the better the greater the available volume of the adhesive layer within the limits of the adhesive-layer thicknesses specified above.

In contrast, the upper limit imposed on the adhesive-layer thickness, apart from possible dimensional requirements, is determined merely by properties of the adhesive that is used with regard to its fulfilling of the requirements for the adhesion and shearing strength and cohesion of the adhesive layer.

In accordance with an additional feature of the invention, in order to produce the thick adhesive layer provided according to the invention, a thick-layer adhesive based on polyurethane or based on polyoxypropylene can preferably be provided which has a shearing strength of about 1.5 N/mm².

Furthermore, in order to increase the range of uses of the connection of the side-wall elements according to the invention through the use of the thick adhesive layer, provision is made for the adhesive connection, in the event of a repair, to be severed mechanically, e.g. through the use of a cutting tool, or thermally, e.g. through the use of a hot wire.

In this way, a side-wall part can be exchanged for another at any time without having to fear damage to the side-wall part or the framework due to the dismantling.

The object which is expressed as a basis for the invention is achieved in such a way as to meet the requirements by achieving the desired traveling comfort not by a high natural bending frequency at appropriate rigidity and appropriate weight of the vehicle but by the natural oscillations being displaced towards low frequencies on one hand and by being damped at the same time through the use of the thick-layer adhesive bond and the damping capacity achieved thereby in such a way that a high degree of traveling comfort is ensured over the entire excited frequency range.

In this layout of the vehicle construction according to the invention, an initiated natural oscillation, regardless of which frequency, is reduced very quickly as a result of the damping that is possible through the use of the thick-layer adhesive bond without the passengers being adversely affected as a result of oscillations.

In order to realize the concept behind the invention in terms of construction, a self-supporting car body, preferably in a framework type of construction, is therefore provided, in which the side-wall elements are relieved of the previous task of being integral components of the load-bearing structure.

In order to guarantee the requisite traveling quality, that is the traveling comfort, it merely has to be ensured that unavoidable oscillations of the car body are damped. This is achieved according to the invention by ensuring that the relative movements between the side wall and the load-bearing vehicle body are damped preferably through the thick-layer adhesive bond mentioned above.

With the objects of the invention in view there is also provided a rail vehicle, comprising a self-supporting car body having a floor, a roof and side walls with windows and entrance regions, the side walls each formed of a framework flexurally rigidly connected to the floor and having framework struts; rigid side-wall elements bearing against the framework, frictionally engaging the framework and being locally fastened to the framework; and the respective side-wall elements and the framework struts moving relative to one another causing friction work, planned to be utilized for dampening oscillations occurring during operation of the rail vehicle.

Thus the damping coupling between the side-wall elements and the framework or the framework struts may be achieved by other damping, for example with the use of appropriate detachable rubber/metal connecting elements or coupling profiles made of highly damping material for a form-locking and/or force-locking connection. A form-locking connection is one which connects two elements together due to the shape of the elements themselves, as opposed to a force-locking connection, which locks the elements together by force external to the elements.

In accordance with another feature of the invention, irrespective of whether the side-wall elements adjoin the framework of the car body through the use of an adhesive layer or through the use of frictionally engaged connecting elements, provision is always made for the side-wall elements to be assembled in the finish-painted final state and to be connected to the framework, with the side-wall elements being provided in each case with insulation.

In accordance with a concomitant feature of the invention, it is only through the utilization of the damping work in the connection between the side-wall elements and the framework, which is intended according to the invention, that it is possible for the rail vehicle to be constructed from the point of view of strength and not from the point of view of rigidity.

This in turn enables simple and thus light constructions to be created, which, in addition to the good traveling comfort, also have an optimum configuration of the entrance regions, which may easily be varied if required without abandoning the basic concept.

The damping of the natural bending oscillations, as described above, is effected by the movement of the load-bearing car structure relative to the side-wall elements of rigid construction which adjoin the car body through the use of an adhesive layer executed in a defined manner or through a connection effective in a frictionally engaged manner. Due to the fact that the connection between the side-wall elements and the car body does not have to absorb any forces, this connection may be of non-rigid construction so that relative movements are possible which are used according to the invention for damping by virtue of the fact that they serve to reduce the oscillation energy by damping work in the connecting layer between the side-wall elements and the car body.

In this case, the area of the hysteresis of the connection as a result of the relative movement is to be considered as damping work.

Other features which are considered as characteristic for the invention are set forth in the appended claims.

Although the invention is illustrated and described herein as embodied in a rail vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, side-elevational view of a portion of a vehicle structure;

FIG. 2 is an enlarged, fragmentary, elevational view of a side wall construction;

FIG. 3 is an oscillation diagram for a rigid car structure according to the prior art; and FIG. 4 is an oscillation curve diagram for the vehicle constructed according to the invention.

DESCRIPTION OF THE PREFERRED EMBODIMENTS

Referring now to the figures of the drawings in detail and first, particularly, to FIG. 1 thereof, there is seen a front-end section of a vehicle 10 configured according to the invention and having a self-supporting car body 12, a side wall 14, an entrance region 16 and a wheel set 18. The car body 12 has a floor 20 and a framework 22 which is connected thereto in a flexurally rigid manner and serves as a supporting structure for the side wall 14 that is formed of side-wall elements 24, 26 that are not shown in FIG. 1 but are shown in detail in FIG. 2. The framework 22 has framework struts as shown.

The framework structure 22 forming the basis of the invention offers the advantages of lightweight construction combined with optimum utilization of weight, there being no restrictions at all with regard to the stability of this lightweight construction.

With the use of a suitable single-component or multi-component adhesive, the side-wall elements 24, 26 are fastened, according to the invention, to the framework 22 through the use of an adhesive bond at a defined thickness of an adhesive layer 28. In this case, a suitable adhesive is understood to be an adhesive having a shearing behavior which tolerates the relative movements occurring between the framework 22 and the respective side-wall element 24, 26 without damage to or even peeling off from the parent or base material and which therefore absorbs oscillations occurring in the framework 22 by appropriate damping work in the adhesive layer. Adhesives which have a shearing strength of about 1.5 N/mm$^2$ prove to be favorable in this case.

The adhesive bond of the layer 28 must therefore have sufficient layer thickness to perform the damping work planned according to the invention for absorbing the oscillations. This is because an adhesive layer which is too thin would not lead to any damping but instead to rigidity of the construction, which on the other hand, as mentioned initially herein, would require other measures for controlling the disturbing oscillations and in addition could only be realized with side-wall elements that were appropriately constructed in terms of strength as load-bearing elements.

FIG. 2 shows a partial longitudinal section through a side wall 14 having transparent and non-transparent side-wall elements 24, 26. It can be recognized from the longitudinal section of FIG. 2 how the side-wall elements 24 in the form of windows made of a translucent material, for example glass, and the side-wall elements 26 formed from a non-transparent material, are attached to the framework structure 22 through the use of the adhesive layer 28. The side-wall elements 26 also have insulation.

In order to illustrate the previous problems, the oscillation curve of a flexural oscillation in a conventional, undamped vehicle tube of high rigidity according to the prior art is shown in FIG. 3 as an example. That type of oscillation runs in an undamped manner at a frequency of about 7 to 8 Hz. In order to improve the running quality of such a vehicle, the natural bending frequency of the car body ought to be displaced to the highest possible frequencies in order to reliably eliminate resonance behavior, but that can only be achieved by corresponding stiffening of the car body in combination with a distinct increase in the vehicle weight.

FIG. 4 shows an oscillation curve of the flexural oscillation of the car body of a vehicle according to the invention. In this case, the natural bending frequencies are certainly lower than in the conventional structures. However, as soon as an oscillation is excited, they are reduced by the relative movement, intended according to the invention, between the framework 22 and the side-wall elements 24, 26 through the adhesive layer 28.

The damping work which the adhesive or the adhesive layer 28 performs corresponds to their hysteresis which results during the passage of an oscillation.

I claim:

1. A rail vehicle, comprising:

a self-supporting car body having a floor, a roof and side walls;

said side walls having windows, entrance regions, a framework flexurally rigidly connected to said floor, and rigid side-wall elements; and an adhesive connection non-load-bearingly fastening said side-wall elements to said framework, said adhesive connection dampening oscillations occurring during operation of the rail vehicle.

2. The rail vehicle according to claim 1, wherein said adhesive connection dampens oscillations occurring during operation of the rail vehicle by performing damping work by relative movement of adhesive partners in said adhesive connection.

3. The rail vehicle according to claim 1, wherein said adhesive connection is a thick-layer adhesive bond having an adhesive layer with a thickness of at least 3 mm.

4. The rail vehicle according to claim 3, wherein said thick adhesive layer has a layer thickness of 3 to 12 mm.

5. The rail vehicle according to claim 3, wherein said adhesive layer of said thick-layer adhesive bond has a thickness of 5 to 8 mm.

6. The rail vehicle according to claim 3, wherein said adhesive layer of said thick-layer adhesive bond has a thickness of 6 mm.

7. The rail vehicle according to claim 1, wherein said adhesive connection has a thick-layer adhesive based on polyurethane with a shearing strength of at least 1.5 N/mm$^2$.

8. The rail vehicle according to claim 1, wherein said adhesive connection is mechanically severable in the event of a repair.

9. The rail vehicle according to claim 1, wherein the rail vehicle is constructed for strength rather than rigidity.

10. The rail vehicle according to claim 1, including insulation for said side-wall elements.

11. A rail vehicle, comprising:

a self-supporting car body having a floor, a roof and side walls with windows and entrance regions, said side walls each having a framework flexurally rigidly connected to said floor and having framework struts;

rigid side-wall elements bearing against said framework, frictionally engaging said framework for causing friction work for dampening oscillations of the rail vehicle and being locally fastened to said framework; and said respective side-wall elements and said framework moving relative to one another causing friction work, planned to be utilized for dampening oscillations occurring during operation of the rail vehicle.

12. The rail vehicle according to claim 11, wherein said side-wall elements are connected to said framework in a finish-painted final state.

* * * * *